US012706813B2

(12) United States Patent
Liu et al.

(10) Patent No.: US 12,706,813 B2
(45) **Date of Patent: *Aug. 11, 2026**

(54) CLOUD NETWORK REACHABILITY ANALYSIS FOR VIRTUAL PRIVATE CLOUDS

(71) Applicant: Google LLC, Mountain View, CA (US)

(72) Inventors: Hui Liu, San Ramon, CA (US); Leslie Choong, Mountain View, CA (US); Hongkun Yang, San Jose, CA (US); Shishir Agrawal, Mountain View, CA (US); Raj Yavatkar, Saratoga, CA (US); Tianqiong Luo, San Clara, CA (US); Gargi Adhav, San Jose, CA (US); Steffen Smolka, Ithaca, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,432

(22) Filed: Mar. 19, 2024

(65) Prior Publication Data

US 2024/0259292 A1 Aug. 1, 2024

Related U.S. Application Data

(63) Continuation of application No. 17/823,860, filed on Aug. 31, 2022, now Pat. No. 11,968,110, which is a (Continued)

(51) Int. Cl.
*H04L 41/14* (2022.01)
*H04L 41/0895* (2022.01)

(Continued)

(52) U.S. Cl.
CPC ........ *H04L 41/145* (2013.01); *H04L 41/0895* (2022.05); *H04L 41/40* (2022.05); *H04L 43/20* (2022.05); *H04L 45/02* (2013.01)

(58) Field of Classification Search
CPC .......................... H04L 41/145; H04L 41/0816
See application file for complete search history.

(56) References Cited

U.S. PATENT DOCUMENTS 9,729,414 B1 8/2017 Oliveira et al.
2016/0036636 A1* 2/2016 Erickson ............. H04L 41/0853 370/254

(Continued)

FOREIGN PATENT DOCUMENTS

JP 2017-524320 A 8/2017
JP 2022-526986 A 5/2022

(Continued)

OTHER PUBLICATIONS

Office Action for the related Japanese Patent Application No. 2021-559267 dated Jan. 26, 2023, 3 pages.

(Continued)

*Primary Examiner* — Hee Soo Kim
(74) *Attorney, Agent, or Firm* — Honigman LLP; Brett A. Krueger

(57) ABSTRACT

A method includes receiving, from a user device, a reachability request requesting a reachability status of network traffic from a first VM of a VPC to a second VM of the VPC. The method also includes obtaining network configuration information defining a configuration of a network connecting the first VM and the second VM, generating, using the network configuration information associated with the VPC, a simulated path between the first VM and the second VM, and, determining, based on the simulated path, that the second VM is unreachable from the first VM. The method further includes, based on determining that the second VM is unreachable from the first VM, generating a reachability report, the reachability report including each hop of the plurality of hops of the simulated path, and a rationale that (Continued)

the second VM is unreachable from the first VM, and providing the reachability report to the user device.

20 Claims, 15 Drawing Sheets

Related U.S. Application Data continuation of application No. 16/840,084, filed on Apr. 3, 2020, now Pat. No. 11,477,110.

(60) Provisional application No. 62/830,159, filed on Apr. 5, 2019.

(51) Int. Cl.

| | |
|---|---|
| ***H04L 41/40*** | (2022.01) |
| ***H04L 43/20*** | (2022.01) |
| ***H04L 45/02*** | (2022.01) |

(56) References Cited

U.S. PATENT DOCUMENTS

| | | | | |
|---|---|---|---|---|
| 2017/0013454 | A1* | 1/2017 | Lee | H04L 63/06 |
| 2017/0180237 | A1* | 6/2017 | Mulka | H04L 45/745 |
| 2018/0115469 | A1* | 4/2018 | Erickson | H04L 41/0853 |
| 2018/0337828 | A1* | 11/2018 | Cohen | H04W 24/08 |
| 2019/0075056 | A1 | 3/2019 | Lu et al. | |
| 2019/0116112 | A1* | 4/2019 | Horn | H04L 45/74 |
| 2020/0007569 | A1* | 1/2020 | Dodge | H04L 43/06 |
| 2020/0204454 | A1* | 6/2020 | Sharma | H04L 41/044 |

FOREIGN PATENT DOCUMENTS

| | | | |
|---|---|---|---|
| KR | 10-2012-0089356 | A | 8/2012 |
| WO | 2010/109673 | A1 | 9/2010 |

OTHER PUBLICATIONS

Abhishek Pathak “Azure Network Watcher Introduces Conectivity Check (Preview)” Published Aug. 22, 2017.

* cited by examiner

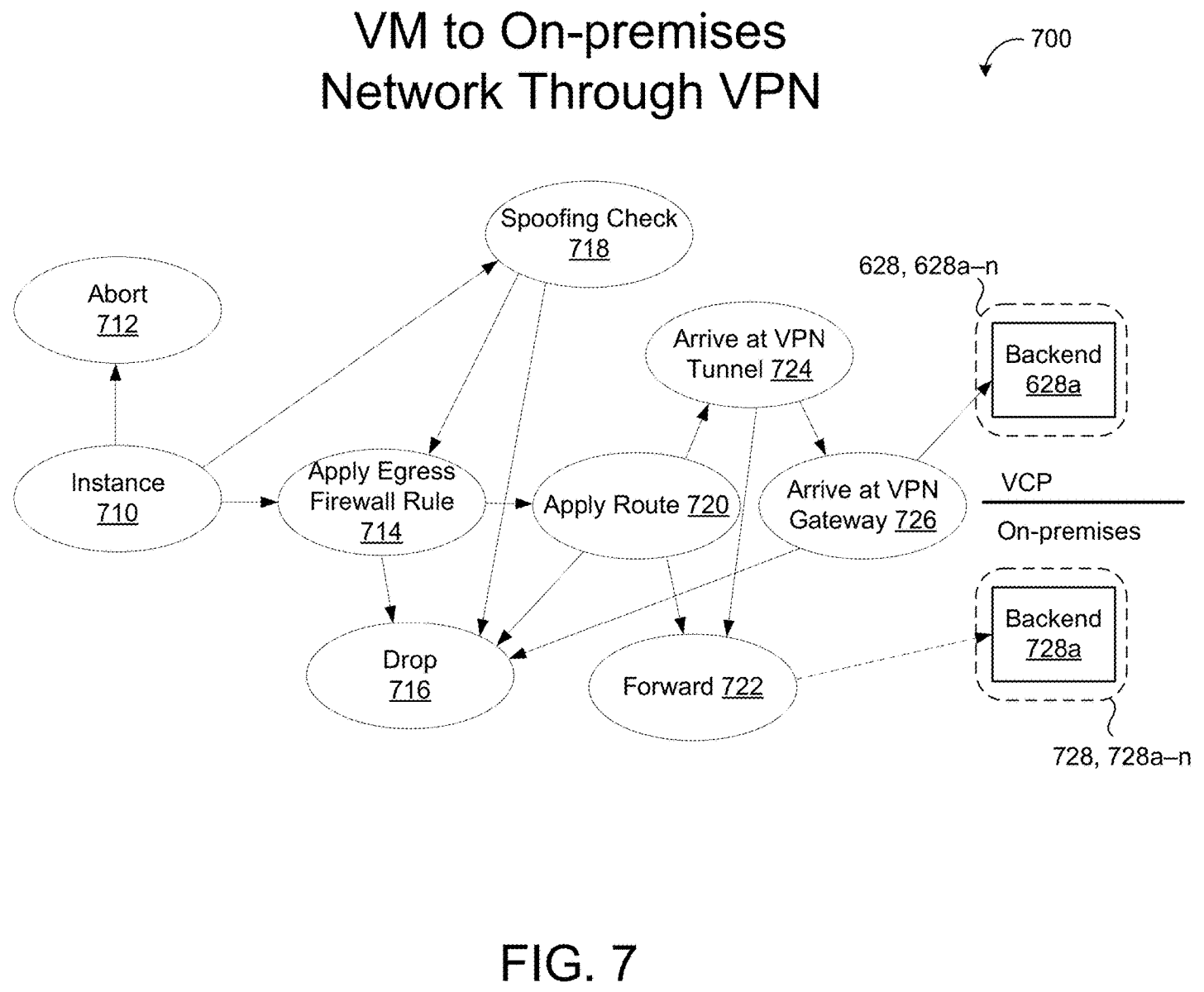

VM to On-premises Network Through VPN

700

Spoofing Check 718

Abort 712

Instance 710

Apply Egress Firewall Rule 714

Apply Route 720

Arrive at VPN Tunnel 724

Arrive at VPN Gateway 726

628, 628a–n

Backend 628a

VCP

On-premises

Backend 728a 728, 728a–n

Drop 716

Forward 722

FIG. 7

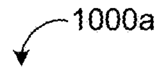

| Final State 172 | Previous State | Cause |
| --- | --- | --- |
| Drop 174a | StartFromInternet | Destination external IP is unknown. |
| | StartFromInstance or ArriveAtInstance | VM is sending or receiving packet under foreign IP but IP forwarding is disabled. |
| | ApplyIngressFirewallRule or ApplyEgressFirewallRule | Packet is denied by firewall rule. |
| | ApplyRoute | No route found. (This should not happen in normal scenarios as usually there's a default route in each network.) |
| | ApplyRoute | Route next hop is blackhole. This can happen if next hop is pointing to a non-exist VM instance or VPN tunnel. |
| | ApplyRoute | Route next hop is a network that does not match the specified destination network. |
| | ApplyRoute | Destination is internal IP sent to Internet Gateway. |
| | ApplyRoute | VM has no external IP and private access is not enabled. |

FIG. 10A

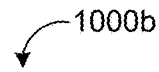

| Final State 172 | Previous State | Cause |
|---|---|---|
| Drop 174a | ApplyRoute | VM has no external IP address, and packets to external IPs and cloud NAT is not enabled. |
| | ApplyRoute or ApplyAtVPNGateway | Destination internal IP is unknown. |
| | ApplyForwardingRule | Packet protocol or ports do not match forwarding rule. |
| | ApplyForwardingRule | Forwarding Rule has no available backends. |
| Forward 174b | ApplyRoute | Forward to a peering VPC in a different project with no config access. |
| | ApplyRoute | Forward to an interconnect. |
| | ArriveAtVPNTunnel | Forward through VPN tunnel to a VPN gateway in on-premises network. |
| Deliver 174c | ApplyRoute | Packet sent to VMC private API |
| | ApplyRoute | Packet sent to Internet (Public hosts with external IP address). |
| | ApplyIngressFirewallRule | Packet sent to VM instance. |
| Abort 174d | StartFromInstance or ArriveAtInstance | VM instance is using host project network configuration and no access to host project's network configuration. |

FIG. 10B

CLOUD NETWORK REACHABILITY ANALYSIS FOR VIRTUAL PRIVATE CLOUDS

CROSS REFERENCE TO RELATED APPLICATIONS

This U.S. patent application is a continuation of, and claims priority under 35 U.S.C. § 120 from, U.S. patent application Ser. No. 17/823,860, filed on Aug. 31, 2022, which is a continuation of U.S. patent application Ser. No. 16/840,084, filed on Apr. 3, 2020, which claims priority under 35 U.S.C. § 119(e) to U.S. Provisional Application No. 62/830,159, filed on Apr. 5, 2019. The disclosures of these prior applications are considered part of the disclosure of this application and are hereby incorporated by reference in their entireties.

TECHNICAL FIELD

This disclosure relates to reachability analysis of a cloud network.

BACKGROUND

A virtual private cloud (VPC) is an on-demand configurable pool of shared computing resources allocated within a public cloud environment. The VPC provides isolation for a user from other cloud users. The VPC may execute one or more virtual machines (VMs) which may communication with the user's on-premises network or other remote resources via a virtual private network (VPN). Due to the potential scale and complexity of the VPC, which may include any number of VMs, network gateways, load balancers, etc., significant network configuration is often necessary to operate and maintain the VPC.

SUMMARY

One aspect of the disclosure provides a method for providing cloud network reachability analysis. The method includes receiving, at data processing hardware, a reachability query requesting a reachability status of a target. The reachability query includes a packet header associated with a data packet. The packet header includes a source Internet Protocol (IP) address associated a source of the data packet and a destination IP address associated with a destination of the data packet. The analysis also includes generating, by the data processing hardware, one or more simulated forwarding paths for the data packet based on the packet header using a data plane model. Each simulated forwarding path includes corresponding network configuration information. The method also includes determining, by the data processing hardware, the reachability status of the target based on the one or more simulated forwarding paths. The method also includes providing, by the data processing hardware, the determined reachability status and the one or more simulated forwarding paths to a user device associated with the reachability query. The one or more simulated forwarding paths when received by the user device, cause the user device to present the network configuration information for each simulated forwarding path.

Implementations of the disclosure may include one or more of the following optional features. In some implementations, determining the reachability status of the one or more simulated forwarding paths includes using a network abstract state machine. The user device may be configured to send the data packet from a remote network using locally advertised routes. In some examples, the network configuration information includes at least one of the following: ports/interfaces for directing the data packet within a virtual private cloud (VPC) network; ports/interfaces for directing the data packet between VPC networks; ports/interfaces for directing the data packet between a VPC network and a non-VPC network; firewall rules applied to the data packet at each step along the corresponding simulated forwarding path; or a network configuration associated with each step along the corresponding simulated forwarding path.

Optionally, the method includes executing, by the data processing hardware, network reachability analysis on each of the one or more simulated forwarding paths based on the corresponding network configuration information. The network reachability analysis may be configured to at least one of: determine a final state of reachability for the data packet along the corresponding simulated forwarding path, discover one or more misconfigurations along the corresponding simulated forwarding path, or discover inconsistent or obsolete configurations along the corresponding simulated forwarding path.

In some implementations, the final state of reachability includes any one of: a delivered state indicating that the data packet will be delivered to the destination, a forwarded state indicating that the data packet will be forwarded to another network having an unknown configuration, a dropped state indicating that the data packet will be dropped due to a configuration checkpoint failure or a missing configuration, or an aborted state indicating the network reachability analysis is not possible due missing critical configurations. Executing the network reachability analysis may include executing the network reachability analysis in at least one of an on-demand mode, a continuous mode, a pre-submit mode, or a post-submit mode.

In some examples, the packet header further includes a protocol associated with the data packet; a source port associated with the data packet; and a destination port associated with the data packet. The source of the data packet may include a first instance executing in a first network and the destination of the data packet may include a second instance executing in a second network different than the first network. In some implementations, the first network includes a VPC network and the second network includes an on-premises network. The first network and the second network may include respective VPC networks.

The source of the data packet may include a first instance and the destination of the data packet may include a second instance. The first instance and the second instance both execute in the same VPC network. The source of the data packet is located in an external network and the destination of the data packet may include a global HTTPS load balancer executing in a VPC network. The global https load balancer is configured to route the data packet to one of multiple different backends. Generating one or more simulated forwarding paths for the data packet may include generating a corresponding simulated forwarding path from the global HTTPS load balancer to each one of the multiple different backends.

Another aspect of the disclosure provides a system for providing could reachability analysis. The system includes data processing hardware and memory hardware in communication with the data processing hardware. The memory hardware stores instructions that when executed on the data processing hardware cause the data processing hardware to perform operations. The operations include receiving a reachability query requesting a reachability status of a target.

The reachability query includes a packet header associated with a data packet. The packet header includes a source Internet Protocol (IP) address associated a source of the data packet and a destination IP address associated with a destination of the data packet. The analysis also includes generating one or more simulated forwarding paths for the data packet based on the packet header using a data plane model. Each simulated forwarding path includes corresponding network configuration information. The operations also include determining the reachability status of the target based on the one or more simulated forwarding paths. The operations also include providing the determined reachability status and the one or more simulated forwarding paths to a user device associated with the reachability query. The one or more simulated forwarding paths when received by the user device, cause the user device to present the network configuration information for each simulated forwarding path This aspect may include one or more of the following optional features. In some implementations, determining the reachability status of the one or more simulated forwarding paths includes using a network abstract state machine. The user device may be configured to send the data packet from a remote network using locally advertised routes. In some examples, the network configuration information includes at least one of the following: ports/interfaces for directing the data packet within a virtual private cloud (VPC) network; ports/interfaces for directing the data packet between VPC networks; ports/interfaces for directing the data packet between a VPC network and a non-VPC network; firewall rules applied to the data packet at each step along the corresponding simulated forwarding path; or a network configuration associated with each step along the corresponding simulated forwarding path.

Optionally, the operations include executing network reachability analysis on each of the one or more simulated forwarding paths based on the corresponding network configuration information. The network reachability analysis may be configured to at least one of: determine a final state of reachability for the data packet along the corresponding simulated forwarding path, discover one or more misconfigurations along the corresponding simulated forwarding path, or discover inconsistent or obsolete configurations along the corresponding simulated forwarding path.

In some implementations, the final state of reachability includes any one of: a delivered state indicating that the data packet will be delivered to the destination, a forwarded state indicating that the data packet will be forwarded to another network having an unknown configuration, a dropped state indicating that the data packet will be dropped due to a configuration checkpoint failure or a missing configuration, or an aborted state indicating the network reachability analysis is not possible due missing critical configurations. Executing the network reachability analysis may include executing the network reachability analysis in at least one of an on-demand mode, a continuous mode, a pre-submit mode, or a post-submit mode.

In some examples, the packet header further includes a protocol associated with the data packet; a source port associated with the data packet; and a destination port associated with the data packet. The source of the data packet may include a first instance executing in a first network and the destination of the data packet may include a second instance executing in a second network different than the first network. In some implementations, the first network includes a VPC network and the second network includes an on-premises network. The first network and the second network may include respective VPC networks.

The source of the data packet may include a first instance and the destination of the data packet may include a second instance. The first instance and the second instance both execute in the same VPC network. The source of the data packet is located in an external network and the destination of the data packet may include a global HTTPS load balancer executing in a VPC network. The global https load balancer is configured to route the data packet to one of multiple different backends. Generating one or more simulated forwarding paths for the data packet may include generating a corresponding simulated forwarding path from the global HTTPS load balancer to each one of the multiple different backends.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a schematic view of a state diagram for the network abstract state machine for simulating a forwarding path between a virtual machine and on-premises network.

FIGS. 10A and 10B are tables of causes for final reachability states for simulated data packets.

Like reference symbols in the various drawings indicate like elements.

DETAILED DESCRIPTION

A virtual private cloud (VPC) is an on-demand configurable pool of shared computing resources allocated within a public cloud environment to provide isolation for a user from other cloud users. This isolation may occur through allocation of private Internet Protocol (IP) subnets and/or virtual communication constructs. The VPC may execute one or more virtual machines (VMs) which may communication with the user's on-premises network or other remote resources via a virtual private network (VPN) to ensure secure access to the VPC environment. Because some VPC environments are very complex with a very large scale (i.e., include a number of VMs, network gateways, load balancers, etc.), significant network configuration is often necessary to operate and maintain the VPC network.

Implementations herein are directed toward a cloud reachability analyzer that allows a user to specify a packet header with a plurality of fields (e.g., source and destination address, protocol, source and destination ports, etc.) and simulate at least one expected forwarding path for the data packet (using the packet header) through the VPC network, peering VPC networks, VPN tunnels, and/or to the user's on-premises network. The cloud reachability analyzer provides configuration information for each simulated path that includes, for example, route and firewall rules. As opposed to actually verifying the state of the forwarding path (i.e., by actually transmitting the data packet), the cloud reachability analyzer instead performs analysis based on active configurations of the VPC network. This may be referred to as "intent-based" packet tracing.

That is, the cloud reachability analyzer provides configuration-based static analysis of network reachability within a VPC or between a VPC and non-VPC networks (e.g., on-premises networks). The user may specify one or more parameters of a packet header and the cloud reachability analyzer generates and simulates packet forwarding paths. The cloud reachability analyzer provides, for each step of each simulated path, the matching configuration (e.g., firewall rule, route, etc.). Thus, the cloud reachability analyzer allows the user to verify intended reachability with their network configuration and helps to discover inconsistent, obsolete, or misconfigured configurations. Additionally, the cloud reachability analyzer validates and detects errors from new configuration changes and analyzes network connectivity impact by proposed configuration changes.

Figure 1:
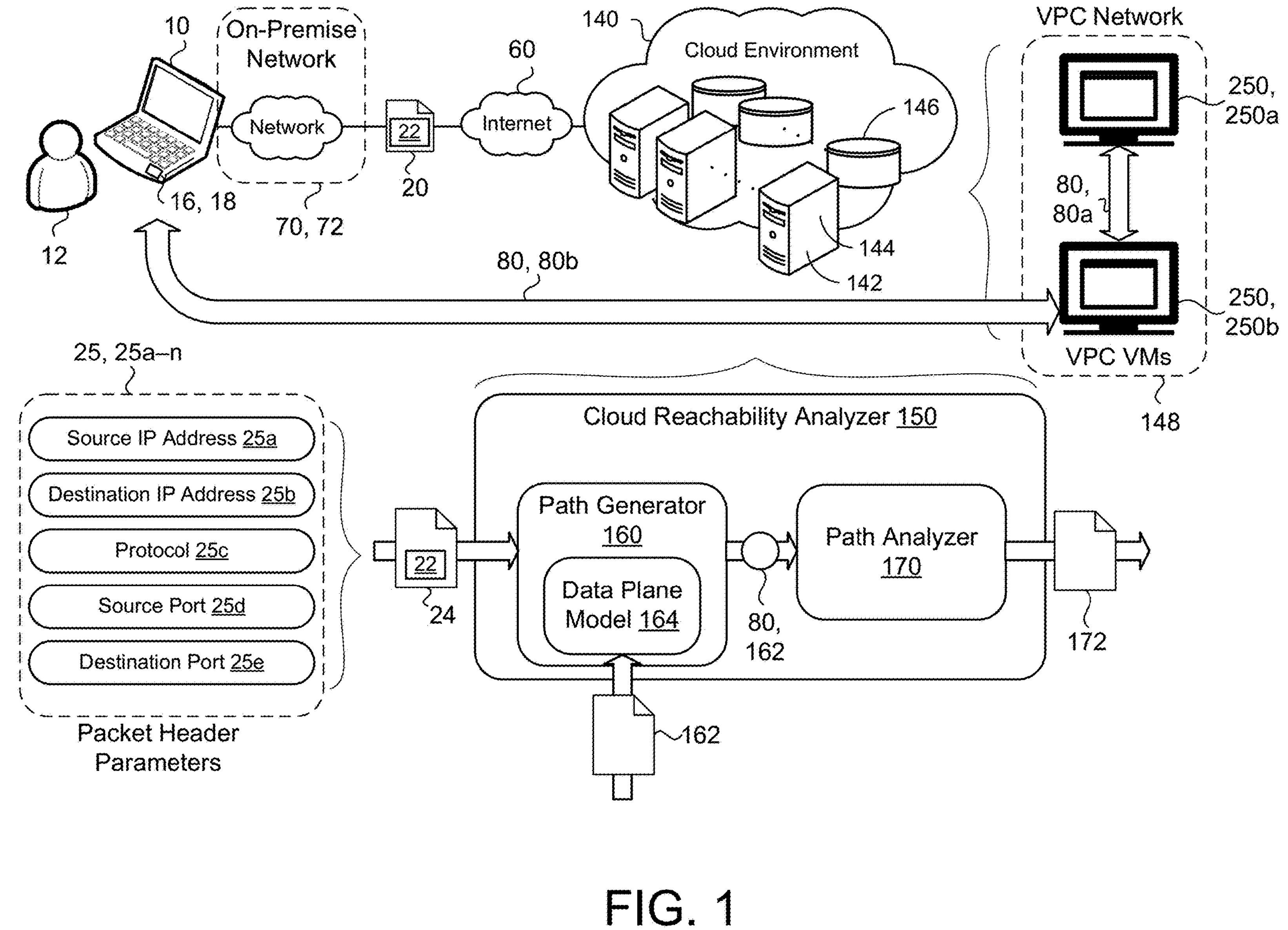
FIG. 1 is a schematic view of an example system for performing cloud network reachability analysis.

Referring to FIG. 1, in some implementations, an example system 100 includes a user device 10 associated with a respective user 12 and in communication with a remote system 140 via a network 60 (e.g., the Internet) and an on-premises network 70 (i.e., the local network that the user device 10 uses to connect to the network 60). The on-premises network 70 include a network gateway 72 (e.g., a router) that serves as the forwarding host for the on-premises network 70. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store (i.e., a remote storage device) may be overlain on the storage resources 146 to allow scalable use of the storage resources 146 by one or more of the client or computing resources 144. The remote system 140 is configured to implement and execute one or more virtual machines (VMs) 250, 250*a-n*. One or more of the VMs execute securely in a virtual private cloud (VPC) environment or VPC network 148 associated with or operated by the user 12. The VPC network 148 may include a variety of other network elements, such as load balancers, gateways, front ends, and back ends.

Figure 2:
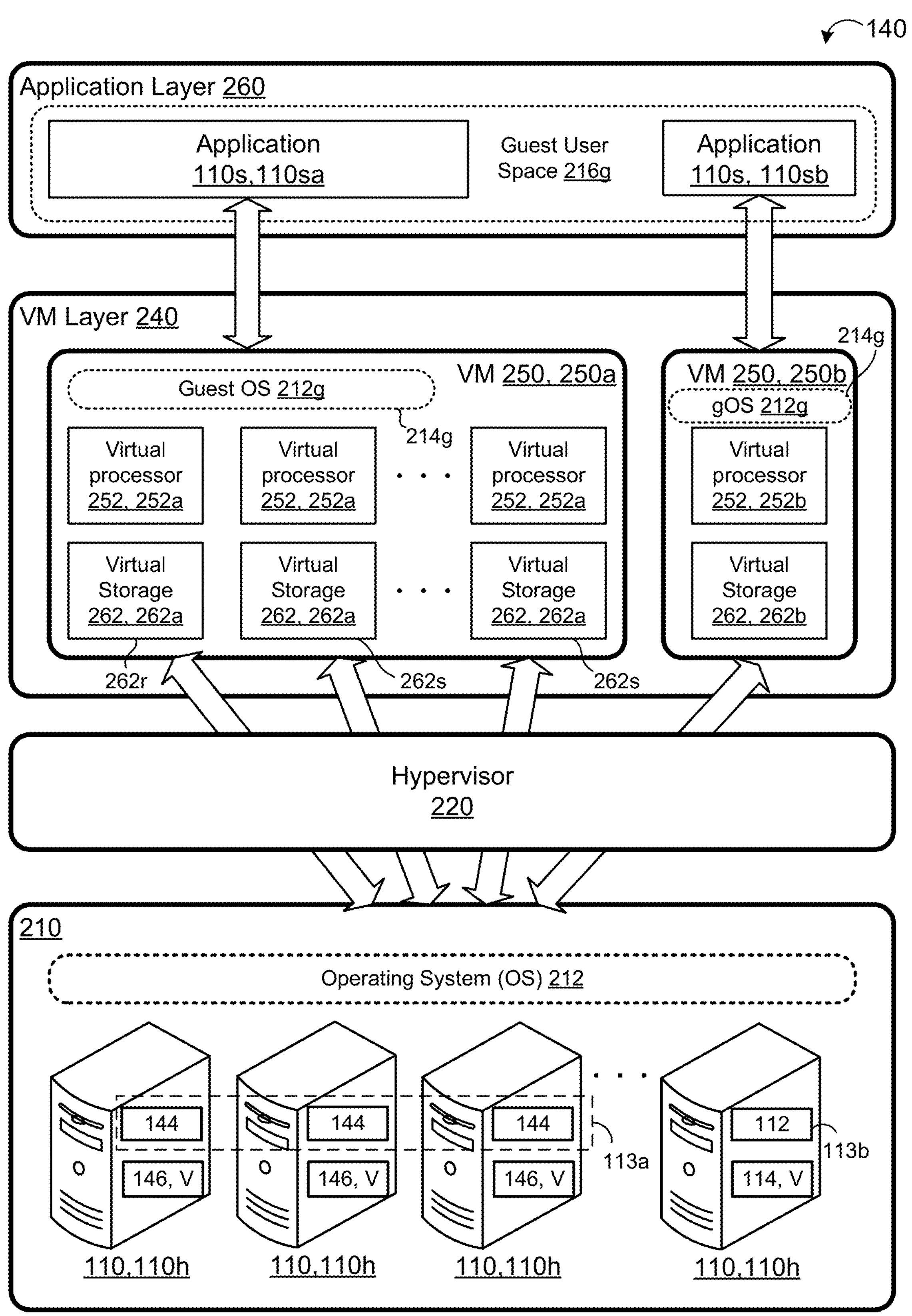
FIG. 2 is a schematic view of exemplary components of a virtual machine of the system of FIG. 1.

In the example shown in FIG. 2, the distributed system 140 includes a collection 210 of resources 110 (e.g., hardware resources 110*h*), a virtual machine monitor (VMM) 220, a VM layer 240 executing one or more of the VMs 250, and an application layer 260. Each hardware resource 110*h* may include one or more physical central processing units (pCPU) 144 ("physical processor 144") and memory hardware 146. While each hardware resource 110*h* is shown having a single physical processor 144, any hardware resource 110*h* may include multiple physical processors 144. An operating system 212 may execute on the collection 210 of resources 110.

In some examples, the VMM 220 corresponds to a hypervisor 220 (e.g., a Compute Engine) that includes at least one of software, firmware, or hardware configured to create and execute the VMs 250. A computer (i.e., data processing hardware 144) associated with the VMM 220 that executes the one or more VMs 250 may be referred to as a host machine, while each VM 250 may be referred to as a guest machine. Here, the VMM 220 or hypervisor is configured to provide each VM 250 a corresponding guest operating system (OS) 212*g* having a virtual operating platform and manage execution of the corresponding guest OS 212*g* on the VM 250. As used herein, each VM 250 may be referred to as an "instance" or a "VM instance". In some examples, multiple instances of a variety of operating systems may share virtualized resources. For instance, a first VM 250 of the Linux® operating system, a second VM 250 of the Windows® operating system, and a third VM 250 of the OS X® operating system may all run on a single physical x86 machine.

The VM layer 240 includes one or more virtual machines 250. The distributed system 140 enables the user 12 to launch VMs 250 on demand. A VM 250 emulates a real computer system and operates based on the computer architecture and functions of the real computer system or a hypothetical computer system, which may involve specialized hardware, software, or a combination thereof. In some examples, the distributed system 140 authorizes and authenticates the user 12 before launching the one or more VMs 250. An instance of software, or simply an instance, refers to a VM 250 hosted on (executing on) the data processing hardware 144 of the distributed system 140.

Each VM 250 may include one or more virtual central processing units (vCPUs) 252 ("virtual processor"). In the example shown, a first virtual machine 250*a* includes a first set 252*a* of one or more virtual processors 252 and a second virtual machine 250*b* includes a second set 252*b* of one or more virtual processors 252. While the second set 252*b* is shown as only including one virtual processor 252, any number of virtual processors 252 is possible. Each virtual processor 252 emulates one or more physical processors 144. For example, the first set 252*a* of the one or more virtual processors 252 emulates a first set 113*a* of one or more physical processors 144, and the second set 252*b* of the one or more virtual processors 252 emulates a second set 113*b* of one or more physical processors 144. The application layer 260 includes software resources 110*s*, 110*sa*, 110*sb* (software applications) that may execute on the virtual machine(s) 250.

Typically, each instance of software (e.g., a virtual machine 250) includes at least one virtual storage device 262 that provides volatile and non-volatile storage capacity for the service on the physical memory hardware 146. For instance, the storage capacity on the physical memory hardware 146 can include persistent disks (PD) that store data for the user 12 across several physical disks (e.g., memory regions 116 (FIG. 13) of the memory hardware 146 or random access memory (RAM) to provide volatile memory. More specifically, each virtual storage device 262 of a corresponding VM 250 moves data in sequences of bytes or bits (blocks) to an associated physical block storage volume V on the memory hardware 146 to provide non-volatile storage. Accordingly, a virtual storage device 262 of a corresponding VM instance 250 provides a storage capacity that maps to corresponding physical block storage volumes V on the memory hardware 146. In some examples, the virtual storage devices 262 support random access to the data on the memory hardware 146 and generally use buffered I/O. Examples include hard disks, CD-ROM drives, and flash drives. Similarly, portions of volatile memory (e.g., RAM) of physical memory hardware 146 may be divided across the virtual storage devices 262.

Within the guest operating system 212*g* resides a guest kernel 214*g*. A kernel is a computer program that is the core of the operating system with full access and control over the OS. That is, the kernel is an intermediary between applications 110*s* and the hardware resources 110*h* of the host machine. Most modern computing systems segregate virtual memory into protected kernel space and user space 216*g*. The kernel typically remains in volatile memory within the protected kernel space and is isolated from user space 216*g*. To increase safety and reliability, applications 110*s* and other software services typically execute in the guest user space 216*g* and lack the privileges necessary to interact with the protected kernel space.

Referring back to FIG. 1, the remote system 140 executes a cloud reachability analyzer 150 for analyzing one or more network forwarding paths 80, 80*a-n* between or within the VPC network 148 and/or the on-premises network 70 to determine a reachability status 172 and/or network configuration information 162 regarding each network forwarding path 80.

The cloud reachability analyzer 150 receives a reachability query 20 from the user device 10 requesting the reachability status 172 of a target. The target may include the on-premises network gateway 72, one or more VMs 250, firewall rules, and/or other components of the VPC network 148 such as a load balancer (FIG. 11)). When the target is a firewall rule, the reachability status 172 depends on whether there exists a packet that can be delivered to the VPC network 148 and hit a specific rule in the configuration. The reachability query 20 includes a packet header 22 (e.g., an Internet Protocol (IP) version 4 (IPv4) or IP version 6 (IPv6) packet header) associated with a data packet 24. In some examples, the reachability query 20 includes the data packet 24 and the associated packet header 22, while in other examples, the cloud reachability analyzer 150 receives the packet header 22 and generates a corresponding data packet 24. The packet header 22 includes a plurality of data packet parameters 25, 25*a-n*. For example, the packet header 22 includes a source Internet Protocol (IP) address 25*a* and a destination IP address 25*b*. Optionally, the packet header 22 includes other parameters 25 such as a protocol type 25*c*, a source port 25*d*, and/or a destination port 25*e*.

The cloud reachability analyzer 150 includes a path generator 160 that receives or obtains the data packet 24 with the associated packet header 22. The path generator 160 generates one or more simulated forwarding paths 80 (herein also referred to as traces) for the data packet 24 based on the packet header 22 using a data plane model 164. Each simulated forwarding path 80 includes corresponding network configuration information 162. The data plane model 164 obtains the network configuration information 162 from network components of the VPC network 148 and includes, for example, ports/interfaces for directing the data packet 24 within the VPC network 148, ports/interfaces for directing the data packet 24 between different VPC networks 148, ports/interfaces for directing the data packet 24 between the VPC network 148 and a non-VPC network (e.g., the on-premises network 70), firewall rules applied to the data packet 24 at each step along the corresponding simulated forwarding path 80, and/or a network configuration associated with each step along the corresponding simulated forwarding path 80. As used herein, each step along the simulated forwarding path 80 refers an intermediate devices (e.g., gateways, load balancers, etc.) between the source instance and destination instance.

The data plane model 164, in some implementations, is an idealized data plane model that models the network 148 data plane by deriving instances from network configuration information 162. In some examples, the network configuration information 162 is stored in a project configuration associated with the VPC network 148. The data plane model 164 analyzes the derived instances to determine and verify reachability properties. That is, the data plane model 164 abstracts relevant network configurations for reachability analysis. The network configuration information 162 may include VPC network configuration information, network services information (e.g., load balances), hybrid cloud configurations, VM configurations, and/or platform configurations (e.g., a platform for containerized applications).

The simulated forwarding paths 80 represents the data packet's 24 forwarding path within the VPC network 148 and/or between the VPC network 148 and the on-premises network 70. For example, one simulated forwarding path 80 represents the forwarding path from a first instance (e.g., VM 250*a*) to a second instance (e.g., VM 250*b*) both executing in the same VPC network 148. Optionally, the source of the data packet for one simulated forwarding path 80 is an instance (e.g., a VM 250) executing in a first network that is a VPC network 148 and the destination is a second instance (e.g., a different VM 250) executing in a second network that is a different VPC network 148 than the first network.

In another example, one simulated forwarding path 80 represents the forwarding path 80 from one VM 250 to an external network (e.g., the Internet 60). That is, the source (i.e., the source IP address 25*a*) of the data packet 24 includes a first instance executing in a first network (e.g., a VM 250 in the VPC network 148) and the destination (i.e., the destination IP address 25*b*) of the data packet 24 includes a second instance executing in a second network (e.g., the on-premises network 70) different than the first network. In yet other examples, the simulated forwarding path 80 represents a VM 250 to a load balancer 1110 (FIG. 11) and/or a VM 250 to the network gateway 72 of the on-premises network 70 (e.g., via a virtual private network (VPN) tunnel). Each of these examples may also be reversed in direction. That is, one of the simulated forwarding path 80 may include the Internet 60 to a VM 250 or load balancer 1110 and/or the on-premises network gateway 72 to a VM 250. The user device 10 may be configured to send the data packet 24 from a remote network (e.g., the on-premises network 70) using locally advertised routes. That is, because the cloud reachability analyzer 150 may not have access to the network configuration information 162 of the on-premises network 70, the cloud reachability analyzer 150 may not validate if the correct route and firewall rules are configured for data packets 24 that originate from the on-premises network 70. However, the cloud reachability analyzer 150 may validate whether the configuration from the VPC network 148 will allow the data packet 24 to be delivered to the intended destination. The most critical configuration validated by the cloud reachability analyzer 150 includes the advertised routes and the ingress firewall rules.

Figure 11:
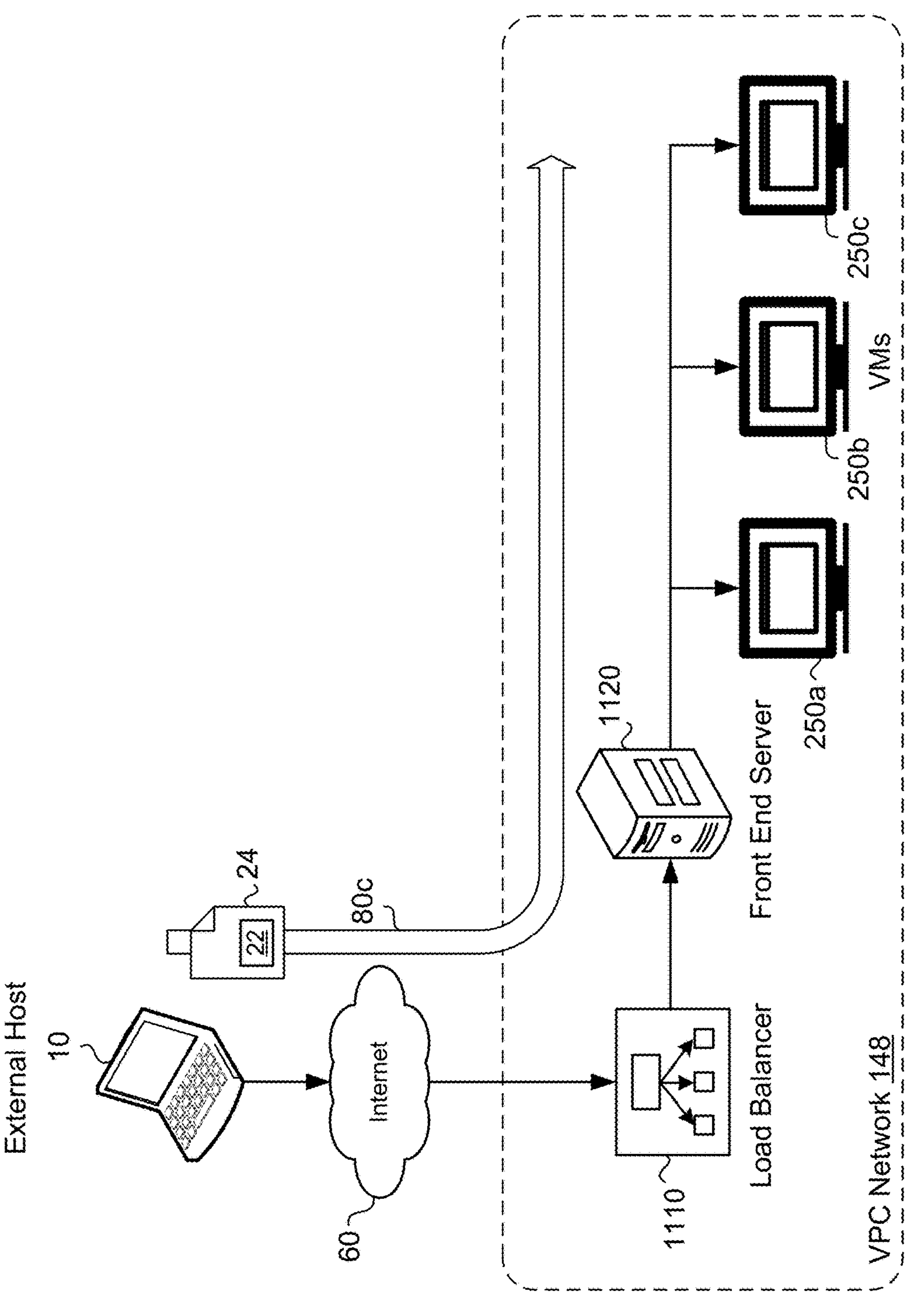
FIG. 11 is a schematic view of a simulated forwarding path between an external host and virtual private cloud virtual machines through a load balancer.

As another example, the source of the data packet 24 is located in an external network (e.g., the on-premises network 70) and the destination of the data packet 24 includes a global HTTPS load balancer 1110 executing in the VPC network 148. The global HTTPS load balancer 1110 may be configured to route the data packet 24 to one of multiple different backend VMs 250 (FIG. 11). The path generator 160 may generate a corresponding simulated forwarding path 80 from the global HTTPS load balancer to each one of the multiple different backend VMs 250.

The exemplary paths 80 discussed herein are illustrative only and not intended to be limiting. That is, the cloud reachability analyzer 150 may analyze or simulate other forwarding paths 80 as well. For example, the cloud reachability analyzer 150 may receive or obtain network configuration information 162 (e.g., from the user 12) for other networks (e.g., the on-premises network 70 or peering VPC networks) and include the simulated paths 80 through these networks. Put another way, the cloud reachability analyzer 150 may analyze forwarding paths 80 through any network and associated network components (e.g., gateways, load balancers, frontends, backends, etc.) that the cloud reachability analyzer 150 obtains network configuration information 162 for. In some examples, the cloud reachability analyzer 150 stops analysis at a point when network configuration information 162 is no longer available (e.g., at the on-premises gateway 72).

The path generator 160 passes the paths 80 and corresponding network configuration information 162 to a path analyzer 170 that determines the reachability status 172 of the target of the reachability query 20 based on the one or more simulated forwarding paths 80. The path analyzer 170, in some examples, executes network reachability analysis on each of the one or more simulated forwarding paths 80 based on the corresponding network configuration information 162. The path analyzer 170 may execute the network reachability analysis in at least one of an on-demand mode, a continuous mode, a pre-submit mode, or a post-submit mode. For example, the reachability query 20 may indicate a request for a single simulation or for continuous simulations until the user device 10 directs the cloud reachability analyzer 150 to stop (or some other threshold is met, e.g., an amount of time has passed). In some implementations, the path analyzer 170 determines a final state of reachability 172 (also referred to herein as the reachability status 172) for the data packet 24 along the corresponding simulated forwarding path 80 by discovering one or more misconfigurations along the corresponding simulated forwarding path 80 or discovering inconsistent or obsolete configurations along the corresponding simulated forwarding path 80.

The cloud reachability analyzer 150 provides the determined reachability status 172 and the one or more simulated forwarding paths 80 to the user device 10 associated with the reachability query 20. As discussed in more detail below, the one or more simulated forwarding paths 80, when received by the user device 10, cause the user device 10 to present the network configuration information 162 for each simulated forwarding path 80 to the user 12.

Figure 3A:
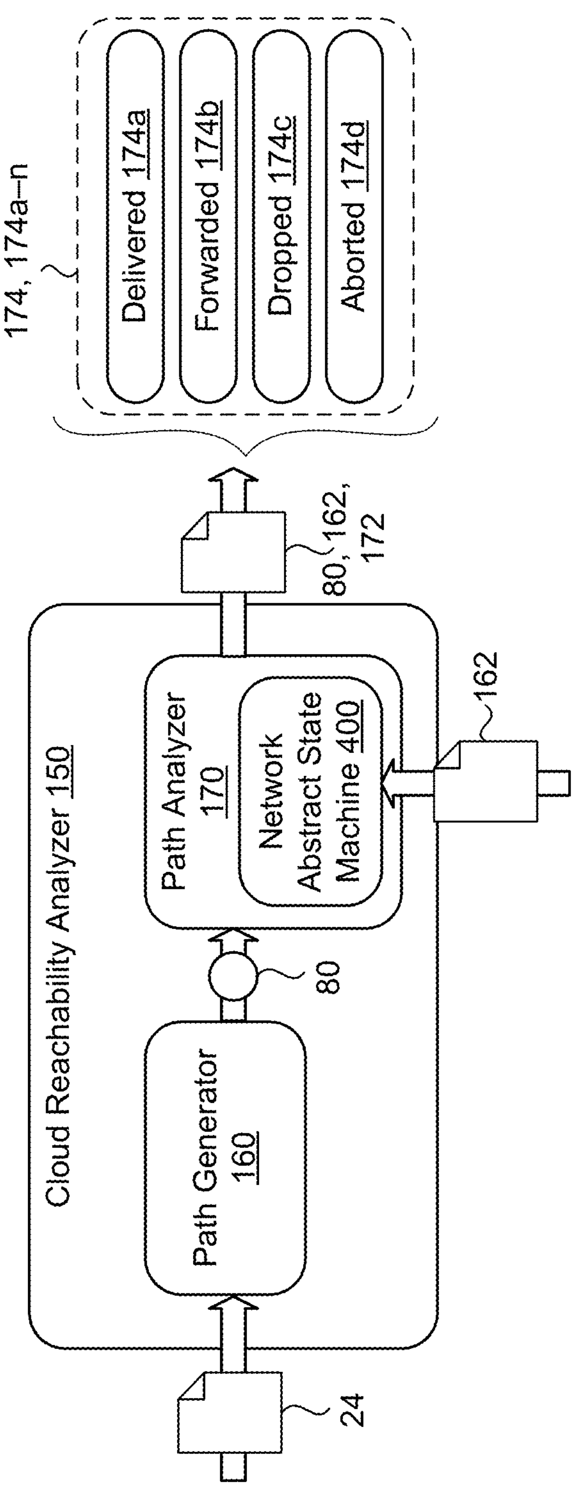
FIG. 3A is a schematic view of exemplary components including a network abstract state machine of the system of FIG. 1.

Referring now to FIG. 3A, in some implementations, the path analyzer 170 includes a network abstract state machine (NAM) 400 for generating the one or more simulated forwarding paths 80. The NAM 400 may be an idealized model for how the VPC network 148 processes data packets. In some examples, the NAM 400 is an abstraction and thus, is independent of the actual implementation of the VPC network 148. Optionally, the NAM 400 determines the final state of reachability 172 of the data packet 24, which includes any one of: a delivered state 174*a* indicating that the data packet 24 will be delivered to the destination, a forwarded state 174*b* indicating that the data packet 24 will be forwarded to another network having an unknown configuration, a dropped state 174*c* indicating that the data packet 24 will be dropped due to a configuration checkpoint failure or a missing configuration, or an aborted state 174*d* indicating the network reachability analysis is not possible due missing critical configurations. The NAM 400 may be non-deterministic in that a state may have multiple successor states. For example, when several routes with the same IP masks and priorities apply to a data packet, a route is chosen among them based on an unspecified hashing function. Although this is a deterministic process in principle, it is better modeled by choosing one of the routes non-deterministically, as the hash function is an internal implementation that is subject to change.

Figure 3B:
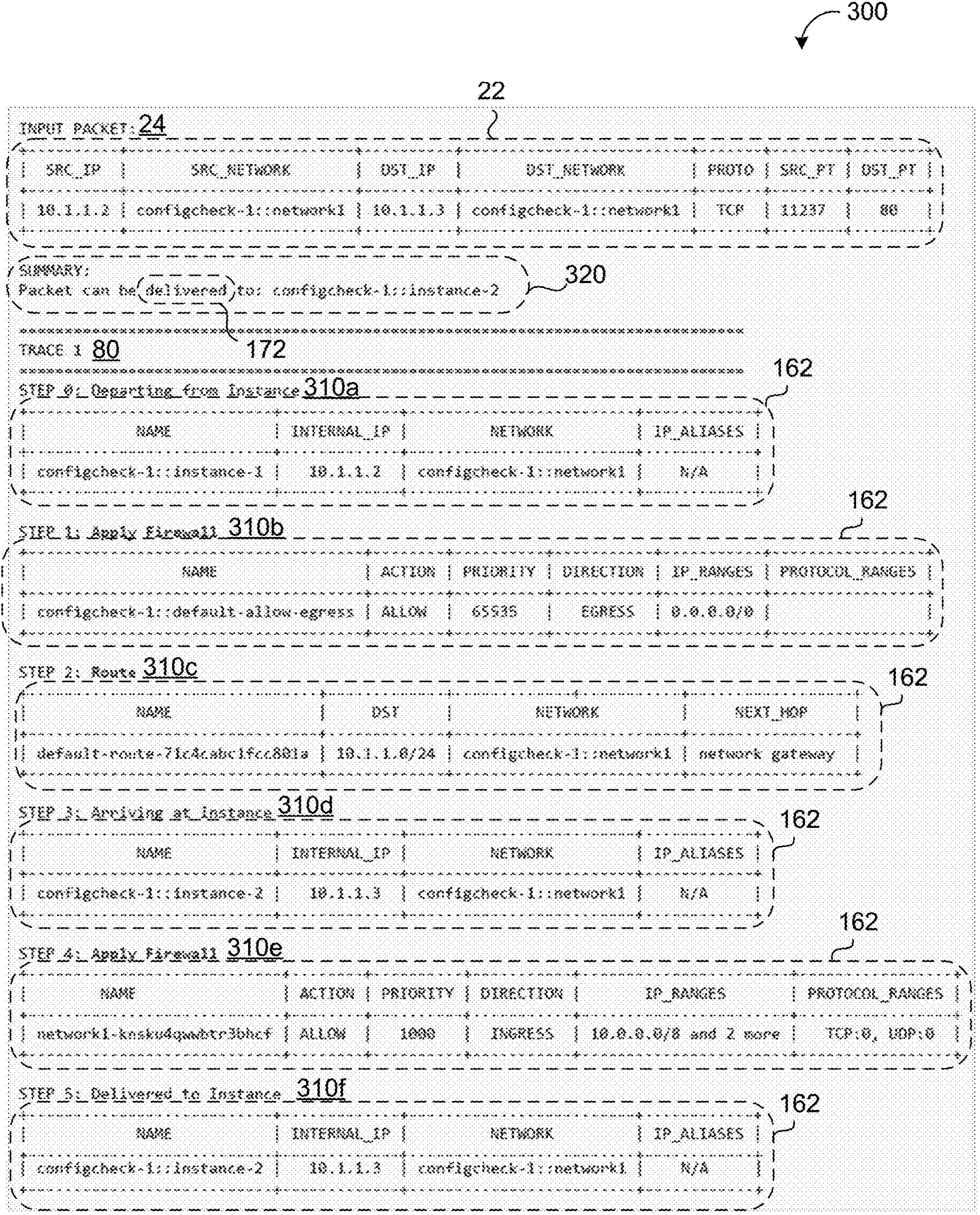
FIG. 3B is a schematic view of an exemplary report indicating a determined reachability status of a simulated forwarding path.

Referring now to FIG. 3B, the cloud reachability analyzer 150 provides the determined reachability status 172 of each simulated forwarding path 80 to the user device 10. This causes the user device to present the network configuration information 162 for each simulated forwarding path 80 to the user 12. For example, a report 300 may indicate to the user 12 details regarding the generated data packet 24 (e.g., the packet header 22). The report 300 may indicate information related to each step 310, 310*a-n* or hop along the trace or simulated forwarding path 80. In the example shown, the data packet 24 departed from the source instance at step 310*a* (i.e., step 0), applied egress firewall rules at step 310*b* (i.e., step 1), routed the data packet at step 310*c* (i.e., step 2), arrived at the destination instance at step 310*d* (i.e., step 3), applied ingress firewall rules at step 310*e* (i.e., step 4), and delivered to the destination instance at step 310*f* (i.e., step 5). Each of these steps 310 includes the relevant network configuration information 162.

The report 300 may indicate a reason or rationale for the determined reachability status 172 of each simulated forwarding path 80 (e.g., packet dropped because denied by firewall rule) to help troubleshoot and/or detect network connectivity caused by inconsistent configurations and invalid configurations or to validate new or changed configurations. In some examples, the cloud reachability analyzer 150 provides configuration change impact analysis. Each of the simulated forwarding paths 80 may be presented as part of a graphical user interface (GUI) on the user device as part of an application (e.g., a web browser). While the example shown provides details regarding only a single forwarding path 80 (i.e., trace 1), each forwarding path 80 simulated may be provided (i.e., multiple traces). In some examples, the report 300 includes a summary section 320 that indicates the determined reachability status 172 of the data packet 24.

Figure 4:
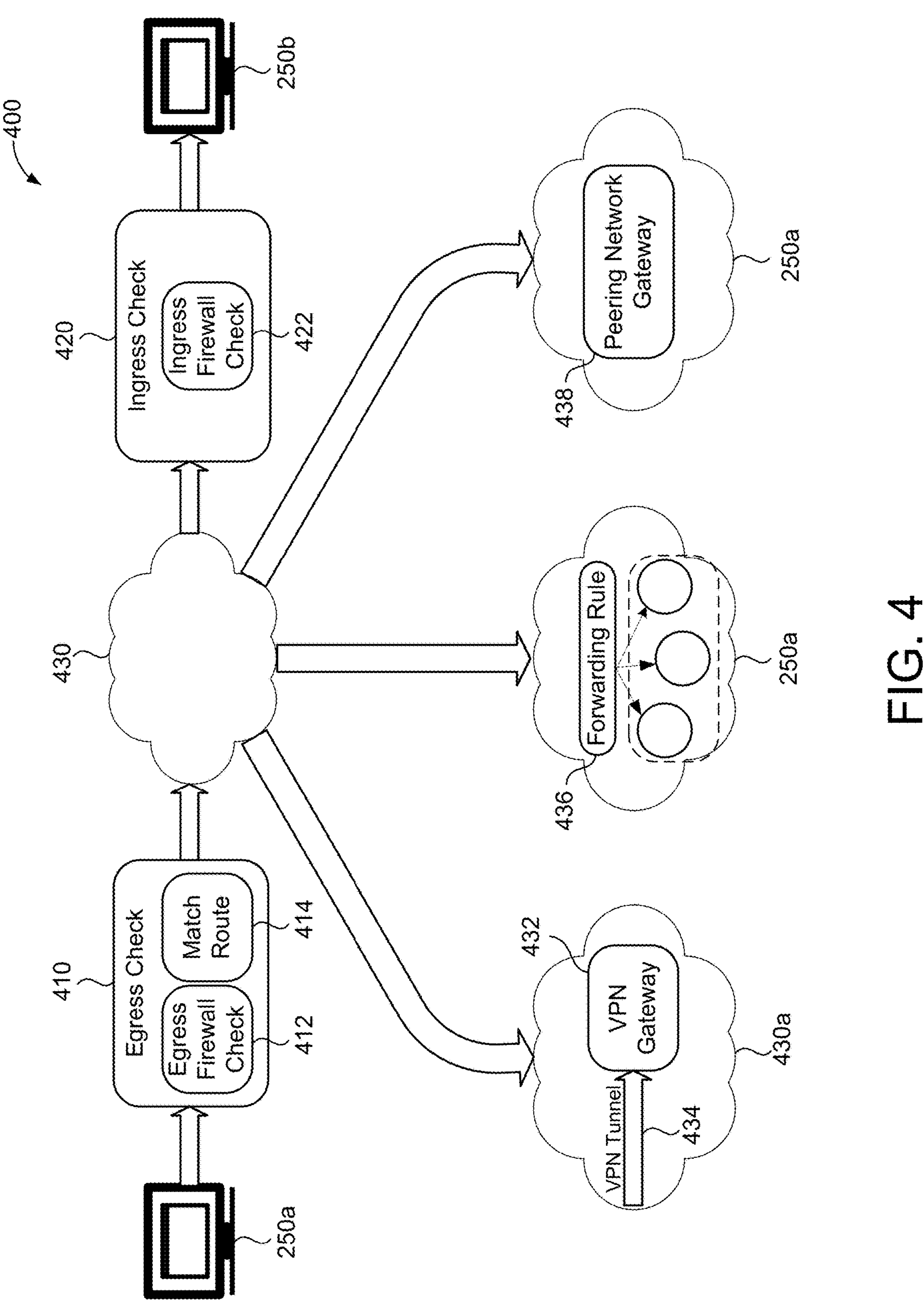
FIG. 4 is a schematic view of the network abstract state machine of FIG. 3.

Referring now to FIG. 4, the NAM 400, in some implementations, includes an egress check 410, an ingress check 420, and a path specific check 430. The egress check 410, in some examples, includes an egress firewall check 412 and a match route 414. The egress firewall check finds (e.g., within the network configuration information 162) the matching egress firewall rule. The egress firewall rules are the firewall rules applied to the source instance (e.g., a VM 250). The match route 414 may find and apply the appropriate route for the simulated forwarding path 80. The match route 414 may also determine, when the source instance is a VM 250, whether there is a matching route for the destination IP address 25*b*. When there is no matching route, the NAM 400 may match the route with a default route with the next hop as the Internet gateway. The ingress firewall check 422, like the egress firewall check 412, finds and applies the matching ingress firewall rule (i.e., the firewall rules applied to the destination instance).

The path specific check 430 is based on the type of simulated forwarding path 80 the NAM 400 is evaluating. That is, the path specific check 430 depends on the source instance and destination instance of the simulated forwarding path 80. For example, when the destination instance is a VPN gateway 432 via VPN tunnel 434, specific states (FIG. 7) are included in the evaluation by the NAM 400. Likewise, when the destination instance is a load balancer with a forwarding rule 436, different states (FIGS. 6 and 8) are evaluated. When the destination instance is a peering network gateway 438, yet other states are evaluated in the state machine of the NAM 400.

Figure 5:
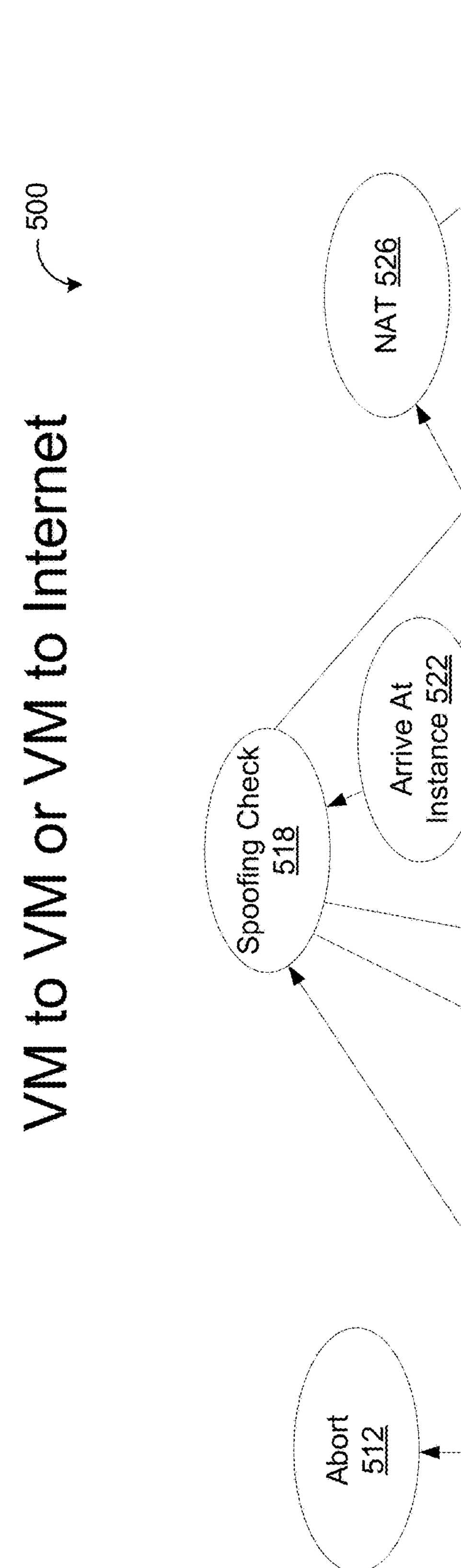
FIG. 5 is a schematic view of a state diagram for the network abstract state machine for simulating a forwarding path between a virtual machine and another virtual machine.

FIGS. 5-9 illustrate exemplary state machines 500, 600, 700, 800, 900 that represent the NAM 400 when analyzing different simulated forwarding paths 80 for the data packet 24. For example, FIG. 5 illustrates the state machine 500 for the NAM 400 when analyzing a simulated forwarding path 80 between a first VM 250 and a second VM 250 or a first VM 250 to the Internet 60. The state machine 500 begins at the instance state 510 which corresponds to the source VM 250. From there, the state machine 500 transitions to the abort state 512 (when analysis cannot proceed due to, for example, missing network configuration information 162), to an apply egress firewall rule 514, or a spoofing check 518 state when the VM 250 is allowed to send/receive data packets with foreign IPs. The data packet 24 may be dropped at the drop state 516 due to a network configuration check fail or for missing network configuration information 162. The appropriate route is found and applied at state 520 and the data packet 24 may arrive at a VM instance at state 522, be forwarded to another network whose configuration is unknown (hence analysis stops) at state 528, have the packet header 22 modified due to a network address translation (NAT) at state 526, or apply ingress firewall rules at state 524. At state 530, the data packet 24 is delivered to the destination specified in the packet header 22.

Figure 6:
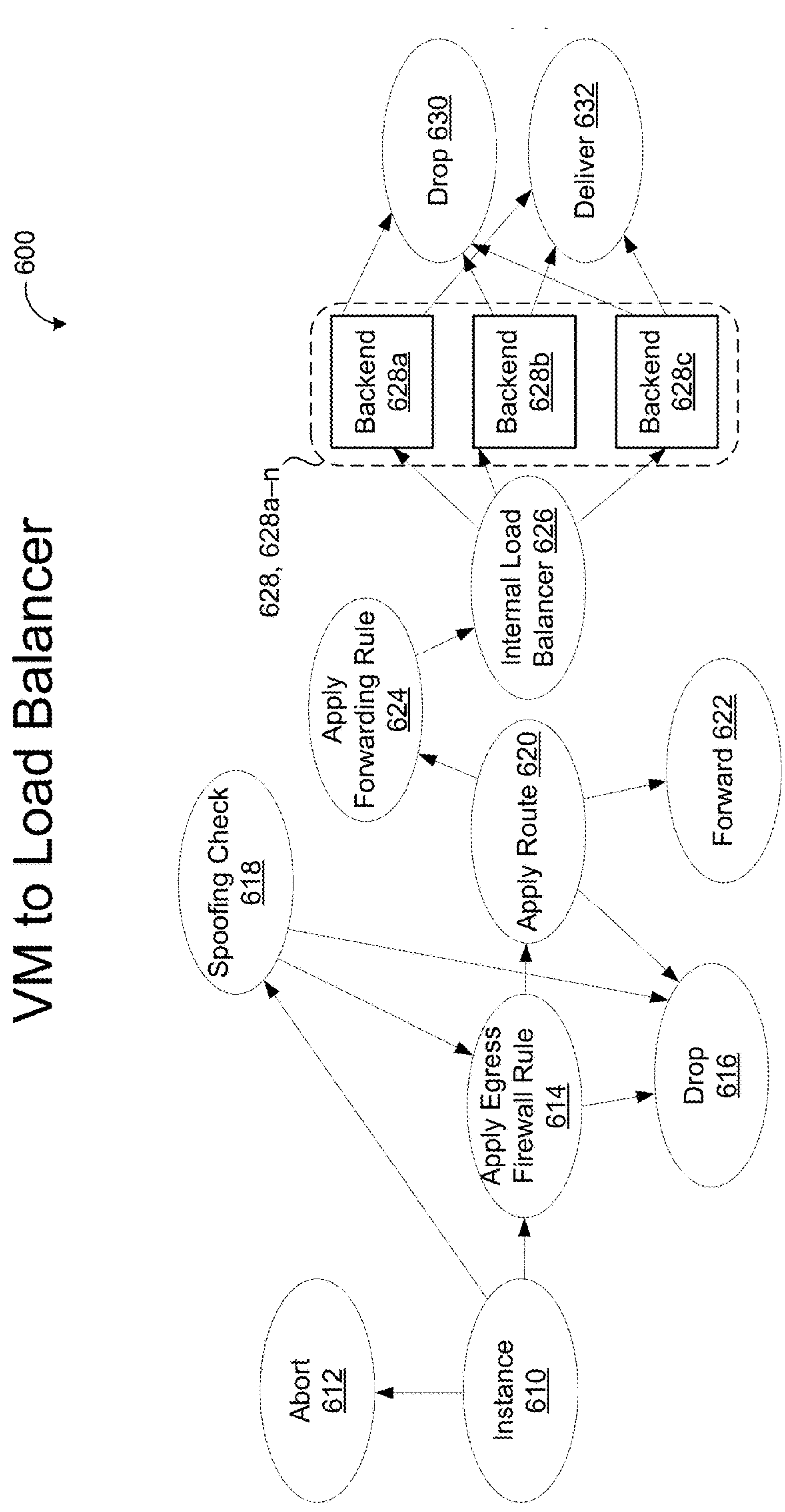
FIG. 6 is a schematic view of a state diagram for the network abstract state machine for simulating a forwarding path between a virtual machine and a load balancer.

Referring now to FIG. 6, the state machine 600 represents the NAM 400 when analyzing a simulated forwarding path 80 between a VM 250 and a load balancer 1110 (FIG. 11). The state machine 600 begins at the instance state 610 which corresponds to the source VM 250. From there, the state machine 600 transitions to the abort state 612 (when analysis cannot proceed due to, for example, missing network configuration information 162), to an apply egress firewall rule 614, or a spoofing check 618 state when the VM 250 is allowed to send/receive data packets with foreign IPs. The data packet 24 may be dropped at the drop state 616 due to a network configuration check fail or for missing network configuration information 162. The appropriate route is found and applied at state 620 and be forwarded to another network whose configuration is unknown (hence analysis stops) at state 622. At state 624, the NAM 400 applies the appropriate forwarding rule, and at state 626 arrives at an internal or external load balancer 1110. From there, the data packet 24 may be forwarded to one or more backends 628, 628*a-n* and the data packet is either dropped at state 630 or delivered at state 632.

Referring now to FIG. 7, the state machine 700 represents the NAM 400 when analyzing a simulated forwarding path 80 between a VM 250 and the on-premises network 70 through a VPN. The state machine 700 begins at the instance state 710 which corresponds to the source VM 250. From there, the state machine 600 transitions to the abort state 712 (when analysis cannot proceed due to, for example, missing network configuration information 162), to an apply egress firewall rule 714, or a spoofing check 718 state when the VM 250 is allowed to send/receive data packets with foreign IPs. The data packet 24 may be dropped at the drop state 716 due to a network configuration check fail or for missing network configuration information 162. The appropriate route is found and applied at state 720 and be forwarded to another network whose configuration is unknown (hence analysis stops) at state 722 and subsequently forwarded to one or more on-premises backends 728, 728*a-n*. At state 724, the data packet 24 arrives at the local side of the VPN tunnel and at state 726 the data packet 24 arrives at the VPN gateway and may be forwarded on to one or more VPC backends 628.

Figure 8:
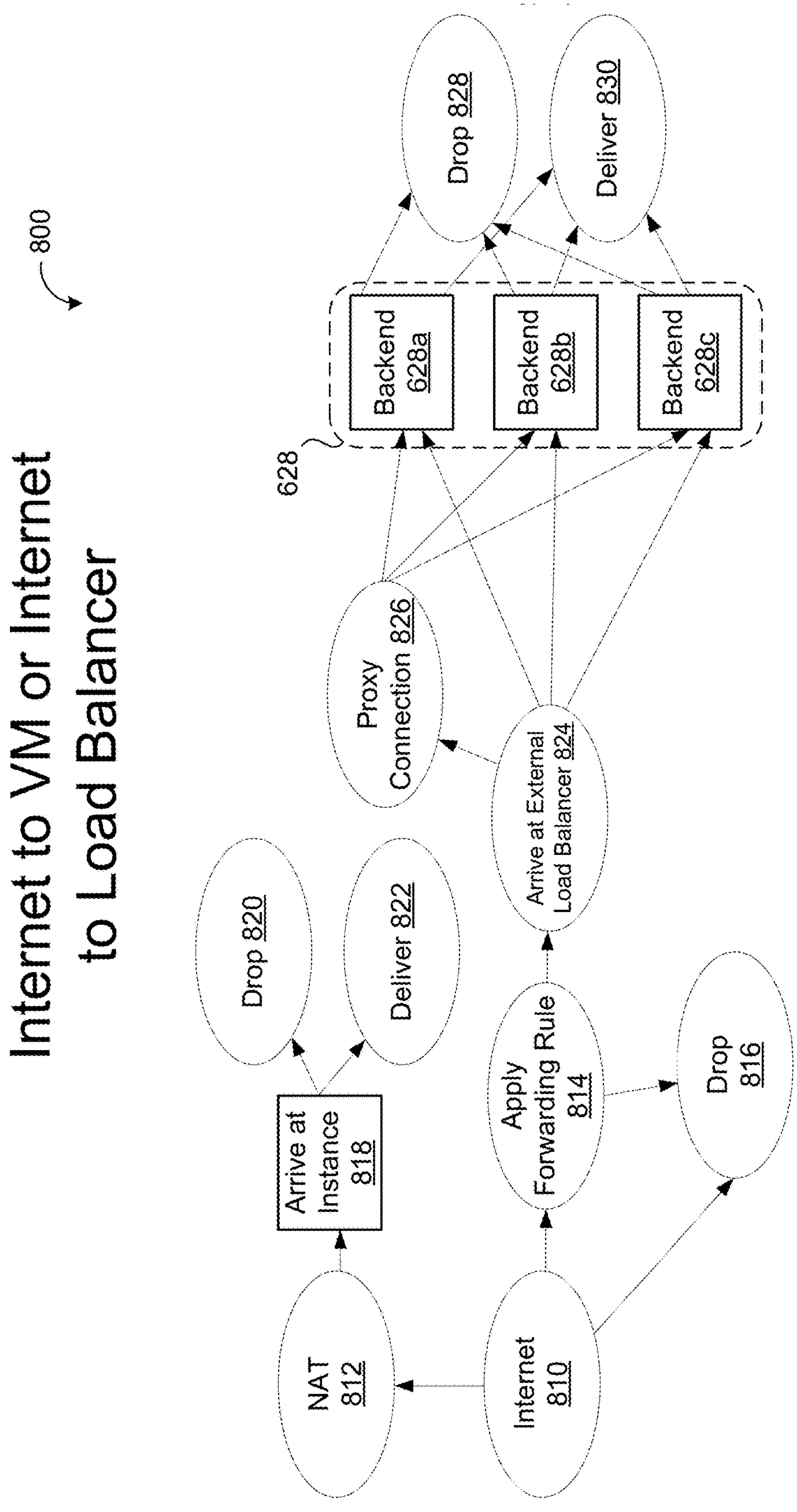
FIG. 8 is a schematic view of a state diagram for the network abstract state machine for simulating a forwarding path between the Internet and a virtual machine.

Referring now to FIG. 8, the state machine 800 represents the NAM 400 when analyzing a simulated forwarding path 80 between the Internet 60 and a VM 250 or the Internet 60 and a load balancer 1110. The state machine 800 begins at the Internet state 810 for a data packet 24 originating from the Internet 60. From there, the state machine 800 may proceed to state 816 when the data packet 24 is dropped due to a network configuration check fail or for missing network configuration information 162. The state machine 800 may also proceed to state 812 and have the packet header 22 modified due to a NAT. From the NAT state 812, the data packet 24 arrives at the VM instance at 818 and is either dropped at state 820 or delivered at state 822. The state machine 800 may also proceed to state 814, when the destination is a load balancer 1110, and apply the appropriate forwarding rule. From there, the state machine 800 proceeds to state 824 where the data packet 24 arrives at the external load balancer. Next, the state machine 800 transitions to the proxy connection state 826 when the previous connection is proxied to a new connection, and the NAM 400 generates a new data packet 24 for subsequent traces or simulations. Otherwise, the state machine 800 simulates forwarding the data packet 24 to one or more backends 628 where the data packet is dropped at state 828 or delivered at state 830.

Figure 9:
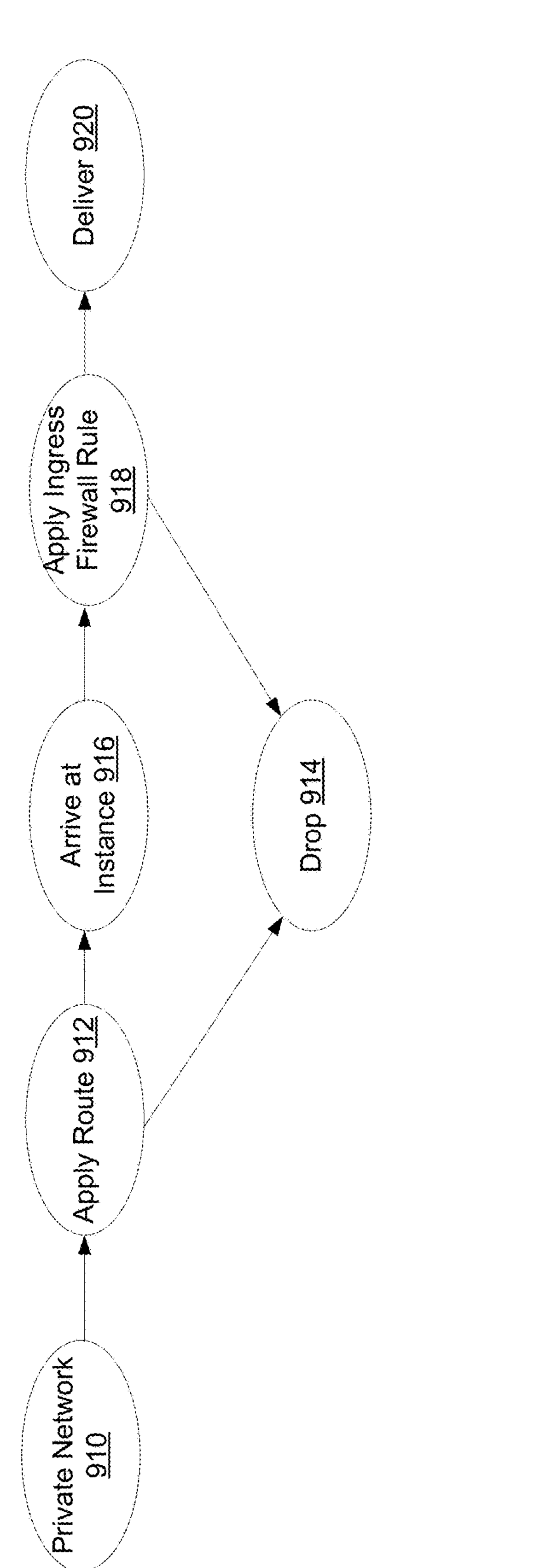
FIG. 9 is a schematic view of a state diagram for the network abstract state machine for simulating a forwarding path between an on-premises network virtual machine and a virtual private cloud virtual machine.

Referring now to FIG. 9, the state machine 900 represents the NAM 400 when analyzing a simulated forwarding path 80 between the on-premises network 70 (e.g., a VM located within the on-premises network 70) to a VPC VM 250. Here, the state machine 900 beings at state 910 with the data packet 24 originating from a private network (e.g., the on-premises network 70). From there, the state machine 900 transitions to state 912 and applies the appropriate route. The state machine 900 next either drops the packet at state 914 due to a network configuration check fail or for missing network configuration information 162 or processed to arrive at the instance at state 916. From there, the NAM 400 applies the ingress firewall rules at state 918 and delivers the data packet at state 920.

In some examples, the cloud reachability analyzer 150 simulates a forwarding path 80 by reverse tracking routes advertised by the VPC network 148 to the on-premises network 70. While the cloud reachability analyzer 150 typically does not have access to the on-premises network configuration, the cloud reachability analyzer 150 does have access to configurations of static and dynamic routes through, for example, a VPN to the on-premises network 70. Thus, the cloud reachability analyzer may simulate the VPC network 148 routes that the on-premises network 70 should have configured or received for dynamic routes. When a data packet 24 is sources from the on-premises network ranges (derived from the VPN related routes), then the cloud reachability analyzer 150 may apply the "inferred" routes on the packet.

Referring now to FIGS. 10A and 10B, tables 1000*a*, 1000*b* illustrate the potential final reachability states 172 for the data packet (i.e., dropped 174*a*, forwarded 174*b*, delivered 174*c*, or aborted 174*d*) in the NAM 400, the previous state of the NAM 400 from the final state (FIGS. 5-9), and the associated cause for the final state. That is, tables 1000*a*, 1000*b* provides exemplary causes for transitioning to final states 174*a*-*d* in the state machines 500, 600, 700, 800, 900.

Referring now to FIG. 11, an exemplary forwarding path 80*c* begins at an external host (e.g., the user device 10), passes, via the Internet 60, to a load balancer 1110 within the VPC network 148. The load balancer 1110 forwards data packets to a front end server 1020 which distributes data packets to one or more backends or VMs 250. The forwarding path 80*c* in this scenario is more complicated than typical network level load balancers. In this example, the cloud reachability analyzer 150 traces the data packet 24 from the external host (e.g., the user device 10) to the load balancer 1110 (e.g., a global HTTPS load balancer). In some examples, the load balancer is a proxy load balancer and thus the TCP connection is terminated at the front end server 1020 and the front end server 1020 initiates a new TCP connection with one or more backend VMs 250. The cloud reachability analyzer simulates this behavior using the NAM 400. While in the actual data plane, the load balancing algorithm may choose a VM for each connection, the cloud reachability analyzer 150 may be a static configuration analysis tool that does not predict the data plane path, but instead identifies any configuration issues to provide the user with additional visibility into expected behavior. Thus, in this case, the cloud reachability analyzer 150 provides a trace for each possible path (e.g., a first trace to VM 250*a*, a second trace to VM 250*b*, and a third trace to VM 250*b*).

Figure 12:
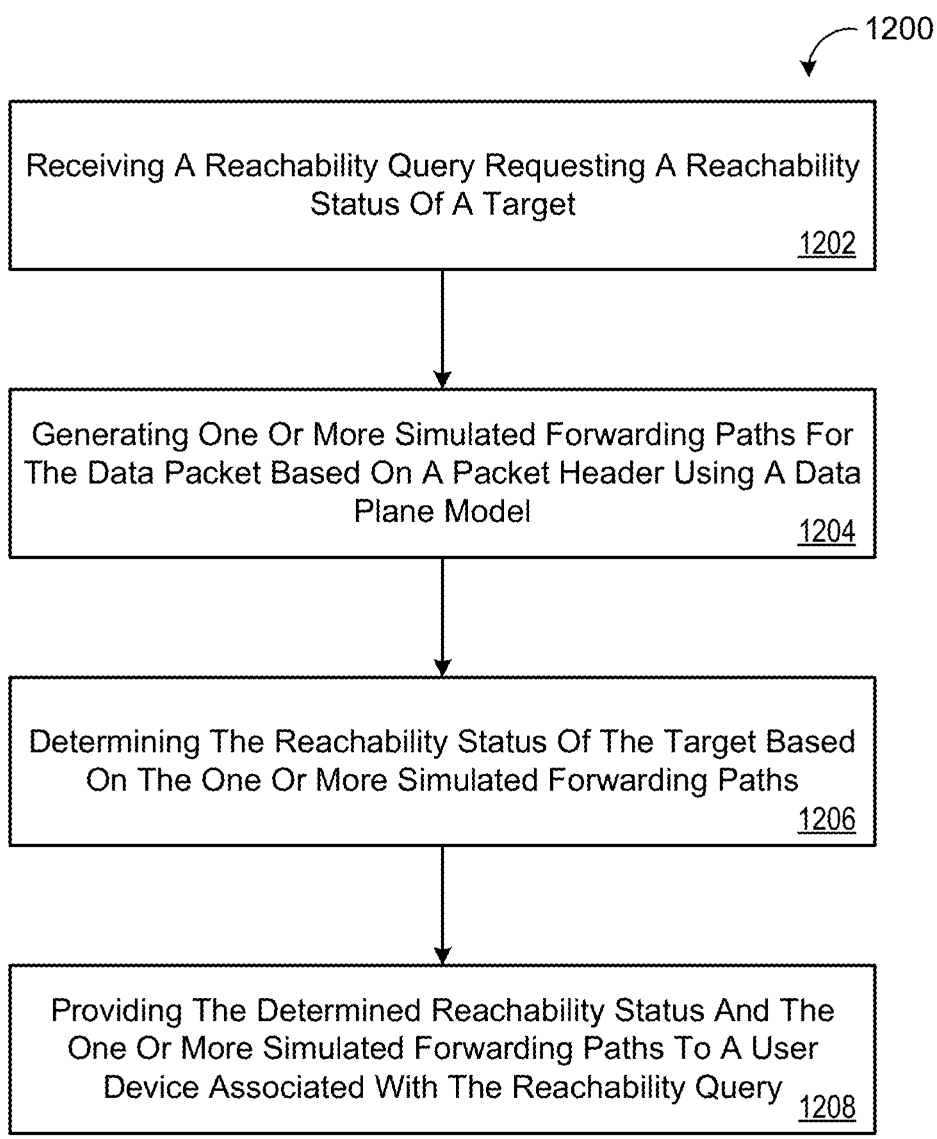
FIG. 12 is a flowchart of an example arrangement of operations for a method of performing cloud network reachability analysis.

FIG. 12 is a flowchart of an exemplary arrangement of operations for a method 1200 of performing cloud network reachability analysis. The method 1200 includes, at operation 1202, receiving, at data processing hardware 144, a reachability query 20 requesting a reachability status 172 of a target 70, 250, 1110. The reachability query 20 includes a packet header 22 associated with a data packet 24 that includes a source IP address 25*a* associated a source of the data packet 24 and a destination IP address 25*b* associated with a destination of the data packet 24.

At operation 1204, the method 1200 includes generating, by the data processing hardware 144, one or more simulated forwarding paths 80 for the data packet 24 based on the packet header 22 using a data plane model 164. Each of the simulated forwarding paths 80 include corresponding network configuration information 162. At operation 1206, the method 1200 includes determining, by the data processing hardware 144, the reachability status 172 of the target 70, 250, 1110 based on the one or more simulated forwarding paths 80. The method 1200, at operation 1208, includes providing, by the data processing hardware 144, the determined reachability status 172 and the one or more simulated forwarding paths 80 to a user device 10 associated with the reachability query 20. The one or more simulated forwarding paths 80, when received by the user device 10, cause the user device 10 to present the network configuration information 162 for each simulated forwarding path 80.

Figure 13:
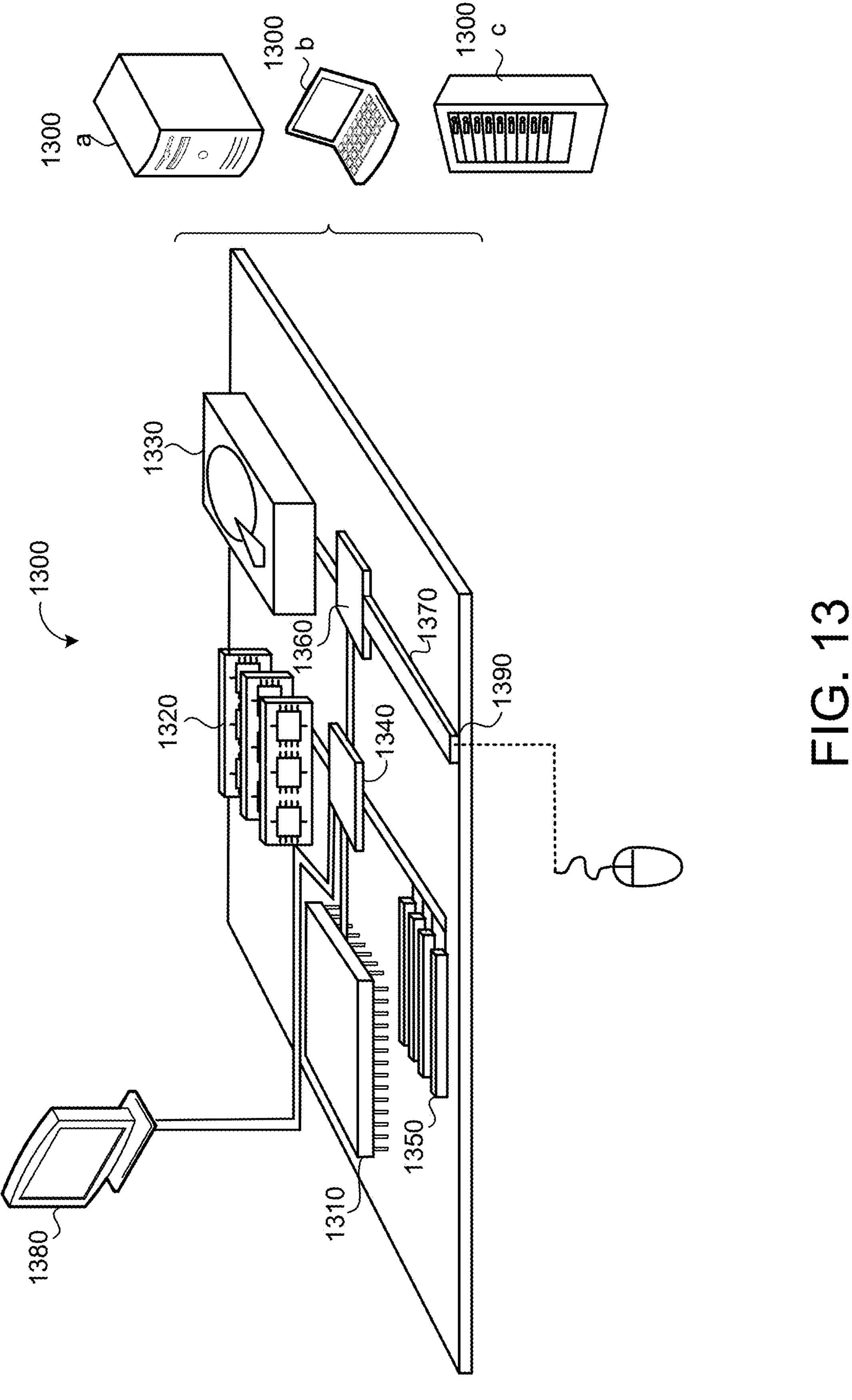
FIG. 13 is a schematic view of an example computing device that may be used to implement the systems and methods described herein.

FIG. 13 is schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1300 includes a processor 1310, memory 1320, a storage device 1330, a high-speed interface/controller 1340 connecting to the memory 1320 and high-speed expansion ports 1350, and a low speed interface/controller 1360 connecting to a low speed bus 1370 and a storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as display 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The non-transitory memory 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and a low-speed expansion port 1390. The low-speed expansion port 1390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1300*a* or multiple times in a group of such servers 1300*a*, as a laptop computer 1300*b*, or as part of a rack server system 1300*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

receiving, from a user device, a reachability request requesting a reachability status of network traffic from a first virtual machine (VM) of a virtual private cloud (VPC) to a second VM of the VPC;

obtaining network configuration information defining a configuration of a network connecting the first VM and the second VM;

generating, using the network configuration information, a simulated path between the first VM and the second VM;

determining, based on the simulated path, that the second VM is unreachable from the first VM; and based on determining that the second VM is unreachable from the first VM, generating a reachability report, the reachability report comprising:

a list of each hop of the simulated path, wherein the list identifies, based on the network configuration information, a matching egress firewall rule applied by the first VM during the simulated path and a matching ingress firewall rule applied by the second VM during the simulated path; and a rationale that the second VM is unreachable from the first VM; and providing the reachability report to the user device.

2. The method of claim 1, wherein the reachability request further comprises a destination port.

3. The method of claim 1, wherein determining that the second VM is unreachable comprises using a network abstract state machine.

4. The method of claim 1, wherein the network configuration information comprises:

ports/interfaces for directing a data packet within the VPC;

firewall rules applied to the data packet at each step along the simulated path; and a network configuration associated with each hop of the simulated path.

5. The method of claim 1, wherein determining that the second VM is unreachable comprises determining:

a dropped state indicating that a data packet will be dropped due to a configuration checkpoint failure or a missing configuration; or an aborted state indicating the second VM is unreachable due to missing configurations.

6. The method of claim 1, wherein the reachability request further comprises:

a source port associated with a data packet; and a destination port associated with the data packet.

7. The method of claim 1, wherein at least one hop comprises a load balancer within the VPC.

8. The method of claim 1, wherein determining that the second VM is unreachable comprises determining from the network configuration information, a path specific check based on a type of the simulated path.

9. The method of claim 8, wherein the type of the simulated path is based on a source instance and a destination instance of the simulated path.

10. The method of claim 1, wherein generating the simulated path between the first VM and the second VM comprises generating the simulated path using a data plane model for the network.

11. A system comprising:

data processing hardware; and memory hardware in communication with the data processing hardware, the memory hardware storing instructions that when executed on the data processing hardware cause the data processing hardware to perform operations comprising:

receiving, from a user device, a reachability request requesting a reachability status of network traffic from a first virtual machine (VM) of a virtual private cloud (VPC) to a second VM of the VPC;

obtaining network configuration information defining a configuration of a network connecting the first VM and the second VM;

generating, using the network configuration information, a simulated path between the first VM and the second VM;

determining, based on the simulated path, that the second VM is unreachable from the first VM; and based on determining that the second VM is unreachable from the first VM, generating a reachability report, the reachability report comprising:

a list of each hop of the simulated path, wherein the list identifies, based on the network configuration information, a matching egress firewall rule applied by the first VM during the simulated path and a matching ingress firewall rule applied by the second VM during the simulated path; and a rationale that the second VM is unreachable from the first VM; and providing the reachability report to the user device.

12. The system of claim 11, wherein the reachability request further comprises a destination port.

13. The system of claim 11, wherein determining that the second VM is unreachable comprises using a network abstract state machine.

14. The system of claim 11, wherein the network configuration information comprises:

ports/interfaces for directing a data packet within the VPC;

firewall rules applied to the data packet at each step along the simulated path; and a network configuration associated with each hop of the simulated path.

15. The system of claim 11, wherein determining that the second VM is unreachable comprises determining:

a dropped state indicating that a data packet will be dropped due to a configuration checkpoint failure or a missing configuration; or an aborted state indicating the second VM is unreachable due to missing configurations.

16. The system of claim 11, wherein the reachability request further comprises:

a source port associated with a data packet; and a destination port associated with the data packet.

17. The system of claim 11, wherein at least one hop comprises a load balancer within the VPC.

18. The system of claim 11, wherein determining that the second VM is unreachable comprises determining from the network configuration information, a path specific check based on a type of the simulated path.

19. The system of claim 18, wherein the type of the simulated path is based on a source instance and a destination instance of the simulated path.

20. The system of claim 11, wherein generating the simulated path between the first VM and the second VM comprises generating the simulated path using a data plane model for the network.

* * * * *